June 10, 1958
O. C. HEWETT
2,838,435
METHOD OF FORMING PLASTIC PARTS
Filed Oct. 8, 1953
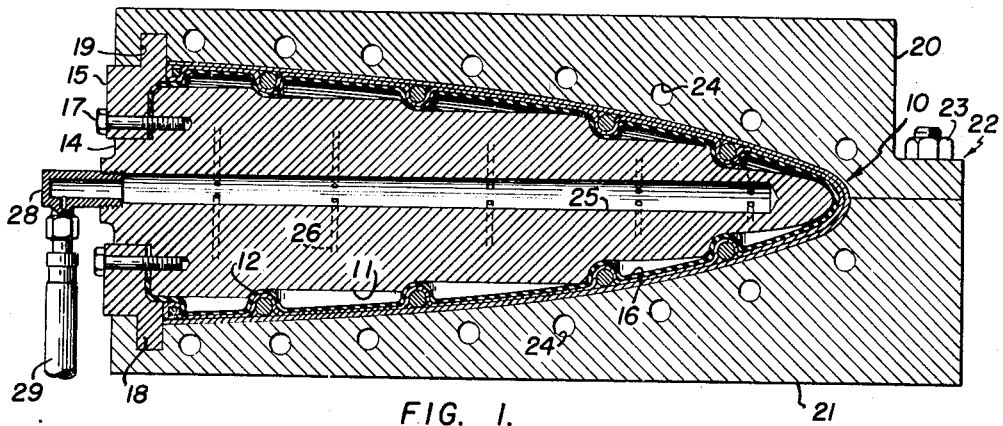
FIG. 1.
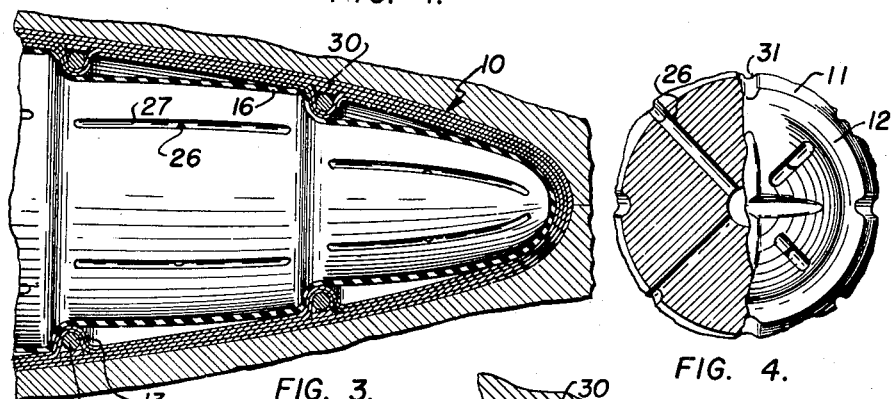
FIG. 3.
FIG. 4.
FIG. 2.
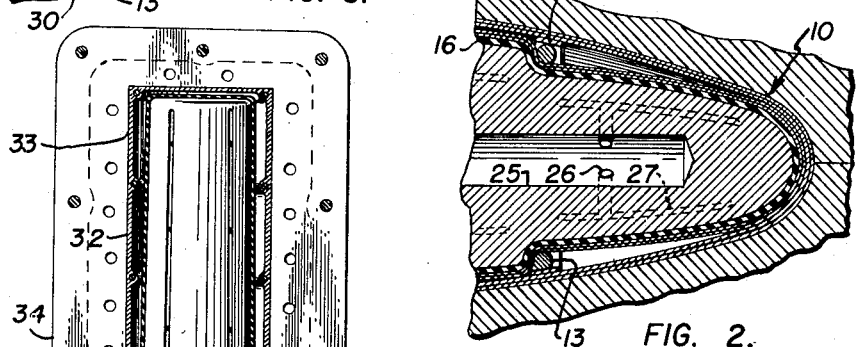
FIG. 5.
OSCAR. C. HEWETT
INVENTOR.
BY
ATTORNEY

United States Patent Office 2,838,435
Patented June 10, 1958

2,838,435

METHOD OF FORMING PLASTIC PARTS

Oscar C. Hewett, Fort Worth, Tex.

Application October 8, 1953, Serial No. 384,813

3 Claims. (Cl. 154—110)

This invention relates to the manufacture of hollow parts made of synthetic resins, and has particular reference to parts of laminated plastic construction.

An object of the invention is to provide a die forming method for making parts having transverse integral projections on the inner surfaces, such as ribs in airplane wings, formers in fuselages and transverse stiffeners in guided missile bodies.

Another object of the invention is to provide relatively large hollow parts of laminated plastic construction in a die forming method without laps or joints and providing a smooth outer surface.

A further object of the invention is to provide an unusually strong, yet relatively light construction for parts having internal ribs or the like as above referred to.

Other objects will become apparent from the following description and the accompanying drawings, wherein:

Figure 1 is a vertical longitudinal section of a mold having a step cut inner mold or mandrel and an elastic blanket around the latter for making a hollow laminated part in accordance with the invention.

Figure 2 is a broken sectional view similar to Figure 1 and showing the elastic blanket in its contracted position, together with the laminated plastic material positioned therearound.

Figure 3 is a broken elevation and sectional view similar to Figure 2, but showing the position of the laminated material after the elastic blanket has been expanded.

Figure 4 is a broken end elevation and sectional view of a mandrel modified for forming longitudinal as well as transverse ribs, and Figure 5 is a plan and sectional view of a further modified form of the invention for molding cylindrical parts.

The need for hollow plastic parts having integral transverse ribs has long been recognized, but the problem of removing a rib forming mold or mandrel from such parts has not been heretofore practical. In accordance with the present invention, a removable rib locating mandrel may be used in combination with an elastic blanket which both expands and contracts for accomplishing the described purpose. The mandrels referred to are either cylindrical or tapered, depending upon the desired shape of the object to be formed. If tapered, the mandrels are step cut, each step being of approximately the same depth as the integral transverse ribs or the like to be formed. Generally, the present method consists of laying up strips of fabric or other flexible sheet material dipped in synthetic resin while the latter is in a liquid stage. The laying up process includes placing preformed ribs or the like on the blanket and over the shoulders of the mandrel. During this phase of the operation, a vacuum is applied to the inside of the blanket for providing a form for the laying up operation. After the laminations are in place the mandrel is placed in a mold. Fluid pressure is then applied to the inside of the blanket and the plastic material is expanded and pressed against the mold surface. After the part becomes solid, a vacuum is again applied to the blanket, contracting the same. The mandrel and formed part are then removed from the mold, and while the blanket is in its contracted position the same is withdrawn from the open end of the part thus made. If the synthetic resin is of the thermosetting type, heat may be applied either through the expanding fluid or to the mold itself for curing the plastic; if the plastic is of the thermoresin type such heat is not necessary and the part will solidify at room temperature.

The apparatus shown in the drawing is for forming a hollow conical part 10, such as the nose of a guided missile. The mandrel 11 is generally conical and is provided with annular shoulders 12, the depth of which is substantially equal to the inwardly projecting thickness of the transverse ribs 13 of the part body 10. The base end 14 of the mandrel 11 is of a reduced diameter and receives a blanket retaining collar 15 therearound. A bag-like expansible blanket 16 is preferably of synthetic rubber, is placed around the mandrel 11 and is secured to the shouldered end thereof by means of the retaining collar 15 which is held in place by bolts 17. An inner flange 18 is provided around the collar 15 for engaging an annular groove 19 in the assembled upper and lower parts 20 and 21 of a mold 22. The mold parts 20 and 21 are secured by means of bolts 23. Temperature control holes 24 may be provided through the mold halves 20 and 21.

A central bore 25 is formed through the base of the mandrel 11 and extends nearly to the apex end thereof, and which bore is provided with lateral ports 26 which extend to the mandrel surface. Longitudinal grooves 27 may be provided in the mandrel surface and communicate with the ports 26 for better distribution of air, as hereinafter referred to. A fitting 28, in turn, is connected with an air hose 29 for alternatively and selectively supplying air pressure for expanding the blanket 16, and for contracting the same.

In operation, the strips of fabrics or other sheet material, not numbered, which have been dipped in liquid plastic, are placed on the blanket 16 while the latter is in its contracted position and out of the mold 22. After several layers of the strips of material have been laid up, the preformed ribs 13 are placed over the previously placed material, and after which additional sheets of the plastic dipped material is laid up over the ribs. If desired, additional transverse strips of plastic dipped material 30 may be placed around the ribs 13 to serve as fillers. The material 11 with the material in place is then placed in the mold in the manner shown in Figure 2, and by applying air pressure through the air hose 29, the blanket is expanded in the manner illustrated in Figure 1. After the material has set up, the part 10 is rigidly formed, and after which the blanket 16 is contracted in the manner illustrated in Figure 3. Curing or polymerization is affected in accordance with the type of synthetic resin used.

The modified form of the invention illustrated in Figure 4 includes all of the previous described parts including the mandrel 11, shoulders 12 and air ports 26. Additionally, longitudinal grooves 31 are formed through the shoulders 12 and in the surface of the mandrel 11 for receiving preformed longitudinal stiffeners, not shown. The operation of the last described form of the invention is carried out as in connection with the first described form.

The form of the invention shown in Figure 5 has to do with forming a part 32 having a cylindrical upper surface. The mold cavity 33 is cylindrical and the mold 34 is also divided in upper and lower parts, only one of which is shown, and is provided with a mandrel 35 substantially cylindrical in shape. Preferably, the mandrel 35 is tapered for easy removal of the part 32. As before, the blanket 26 is secured in place by a retaining collar 37, the latter having a blanket 38 for securing and supporting the mandrel 35 in the mold 34. Air pressure and vacuum is supplied through a hose 39 and fitting 40 to a longitudinal bore, not shown, extending into the mandrel 35. The operations of laying up, expanding the blanket, and subsequently contracting the same after the part 32 is formed, is carried out in the manner above described.

The invention is not limited to the steps of operation and apparatus herein shown and described, but may be varied within the scope of the appended claims.

What is claimed is:

1. The method of forming a hollow part on an elongated inner mold having an elastic blanket thereon and which method includes the use of a cavity mold for defining the outer surface of the part to be formed, said method comprising the steps of; contracting said blanket on said inner mold, applying resin impregnated strips of fabric while said resin is in a fluid stage on the outer surface of said blanket, placing a transverse rib on said resin impregnated strips of fabric while said resin is still in the fluid stage, expanding said blanket inside of said cavity mold and thereby causing the outer surface of said resin and strips of fabric to contact the inner surface of said cavity mold, solidifying said resin while said blanket is expanded, contracting said blanket and removing said mandrel and said blanket from the part thus formed.

2. The method of forming a hollow part as defined in claim 1, and the additional steps of providing a longitudinal groove in the surface of said inner mold, placing a longitudinal stiffener on said blanket and in said resin while said resin is in a fluid stage.

3. The method of forming a hollow part as defined in claim 1, and including the additional steps of providing a transverse groove in said inner mold, and placing a rib around said blanket at a location coinciding with said groove at the time said resin impregnating said strips of fabric is in a fluid stage.

References Cited in the file of this patent

UNITED STATES PATENTS

| 969,131 | Cobb | Aug. 30, 1910 |
| 1,149,669 | Mauersberger | Aug. 10, 1915 |
| 1,289,772 | Hopkinson | Dec. 31, 1918 |
| 1,475,623 | Egerton | Nov. 27, 1923 |
| 2,446,281 | Harding | Aug. 3, 1948 |

FOREIGN PATENTS

| 115,160 | Australia | May 13, 1942 |

OTHER REFERENCES

"Low-Pressure Laminates For Aircraft"—British Plastics; December 1951; pages 415–420.

UNITED STATES PATENT OFFICE
CERTIFICATE OF CORRECTION

Patent No. 2,838,435                                                    June 10, 1958

Oscar C. Hewett

It is hereby certified that error appears in the printed specification of the above numbered patent requiring correction and that the said Letters Patent should read as corrected below.

Column 2, line 46, for "material 11" read -- mandrel 11 --; column 3, line 24, for "mandrel" read -- inner mold --.

Signed and sealed this 2nd day of September 1958.

(SEAL)
Attest:
KARL H. AXLINE                                              ROBERT C. WATSON
Attesting Officer                                       Commissioner of Patents